Aug. 26, 1941.  I. A. MERIWETHER  2,253,978
VARIABLE CAPACITOR
Filed Feb. 29, 1940
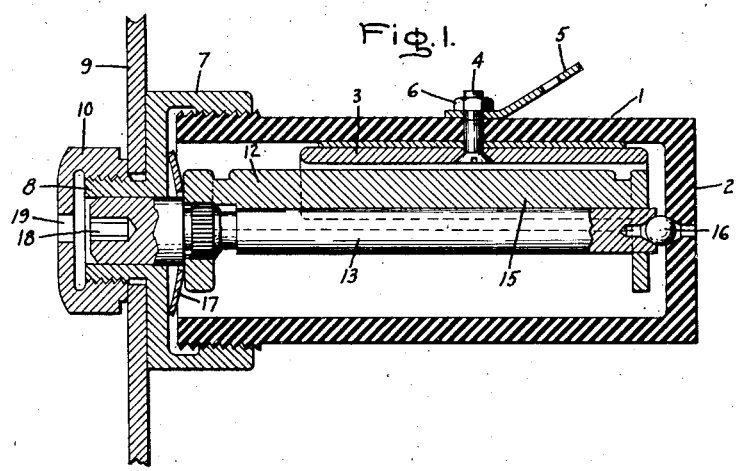
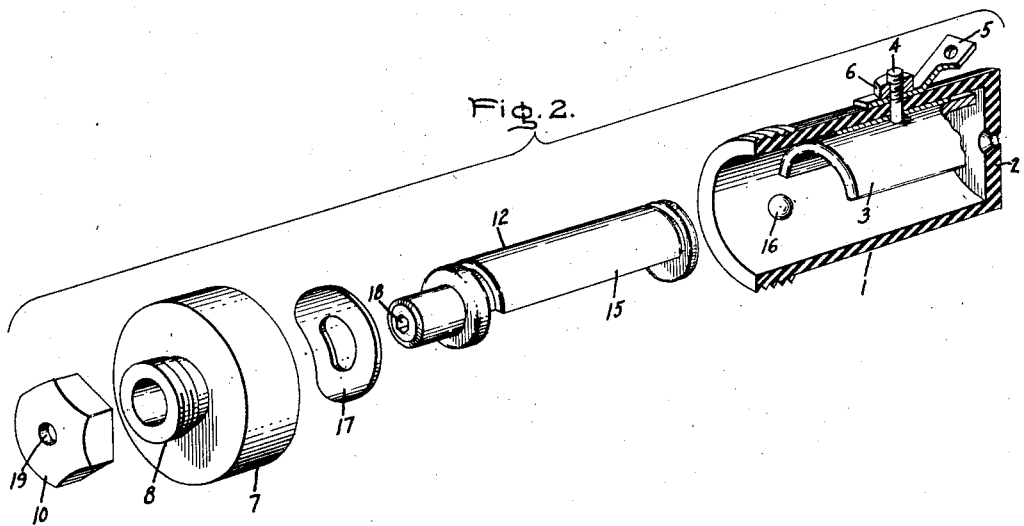
Inventor:
Irby A. Meriwether,
by Harry E. Dunham
His Attorney.

Patented Aug. 26, 1941

2,253,978

UNITED STATES PATENT OFFICE 2,253,978

VARIABLE CAPACITOR

Irby A. Meriwether, Schenectady, N. Y., assignor to General Electric Company, a corporation of New York Application February 29, 1940, Serial No. 321,485

1 Claim. (Cl. 175—41.5)

My invention relates to variable capacitors and the object thereof is to provide an improved capacitor construction which is dust and moisture proof, is adapted to be secured to an instrument panel requiring only a single opening therein, has low losses and is inexpensive to manufacture.

My invention will be better understood from the following description taken in connection with the accompanying drawing and its scope will be pointed out in the appended claim.

In the drawing Fig. 1 is a longitudinal cross sectional view illustrating an embodiment of my invention and Fig. 2 is an exploded view of the parts comprising the capacitor shown in Fig. 1.

The capacitor comprises the insulating housing 1 which preferably is tubular in form having an integral end 2. The housing preferably is constructed of a strong, hard, insulating material having high dielectric strength such as that known to the trade as Isolantite. In the housing 1 is the arcuate electrode 3 which is secured to a side wall of the housing by means of the bolt 4. The bolt also serves as a terminal stud for the electrode, the terminal strip 5 being clamped under the nut 6 on the bolt. At the open end of the housing is the metallic cap 7 which is threaded on the housing and is provided with the threaded reduced central portion 8 which is adapted to project through a suitable opening in an instrument panel as shown at 9. By turning up the nut 10 the ring with the attached housing may be firmly clamped to the panel.

The rotor 12 within the housing is shown as comprising the shaft portion 13 to which is secured the movable arcuate electrode 15 which cooperates with the fixed electrode 3. The shaft 13 is journaled at one end in the reduced portion 8 of the ring 7 in a manner to prevent the passage of dirt and moisture into the housing and at the other end engages the ball 16 which is held in the end wall 2 of the housing. The ball therefore provides both a centering bearing and a thrust bearing for the rotor of the capacitor, it being understood that the ball makes such a snug fit with the housing that dirt and moisture are excluded thereby. The rotor is resiliently pressed against the ball 16 by means of the spring washer 17 which can be variably tensioned by reason of the threaded engagement of the ring with the housing. For the purpose of adjusting the position of the rotor the end of the shaft 13 is shown provided with the hexagonal opening 18 into which may be inserted a wrench having a hexagonal end through the central opening 19 in the nut.

What I claim as new and desire to secure by Letters Patent of the United States is:

A variable capacitor comprising a tubular housing of insulating material having an end wall integral with the tubular wall thereof, an arcuate electrode secured to the inner curved face of said tubular wall, a combined terminal and securing member for said electrode extending radially through the electrode and the tubular wall, a metallic cap having a threaded portion receiving the other end of said housing and having a reduced central portion adapted to extend through a supporting panel, means for clamping said cap against said panel, a shaft journalled at one end in the reduced portion of said cap and having a bearing at the other end with said housing and an electrode secured to said shaft and provided with an arcuate outer face concentric with said arcuate electrode.

IRBY A. MERIWETHER.